No. 851,294. PATENTED APR. 23, 1907.
E. F. PARKS & S. W. WARDWELL.
BRAIDING MACHINE.
APPLICATION FILED AUG. 14, 1905.

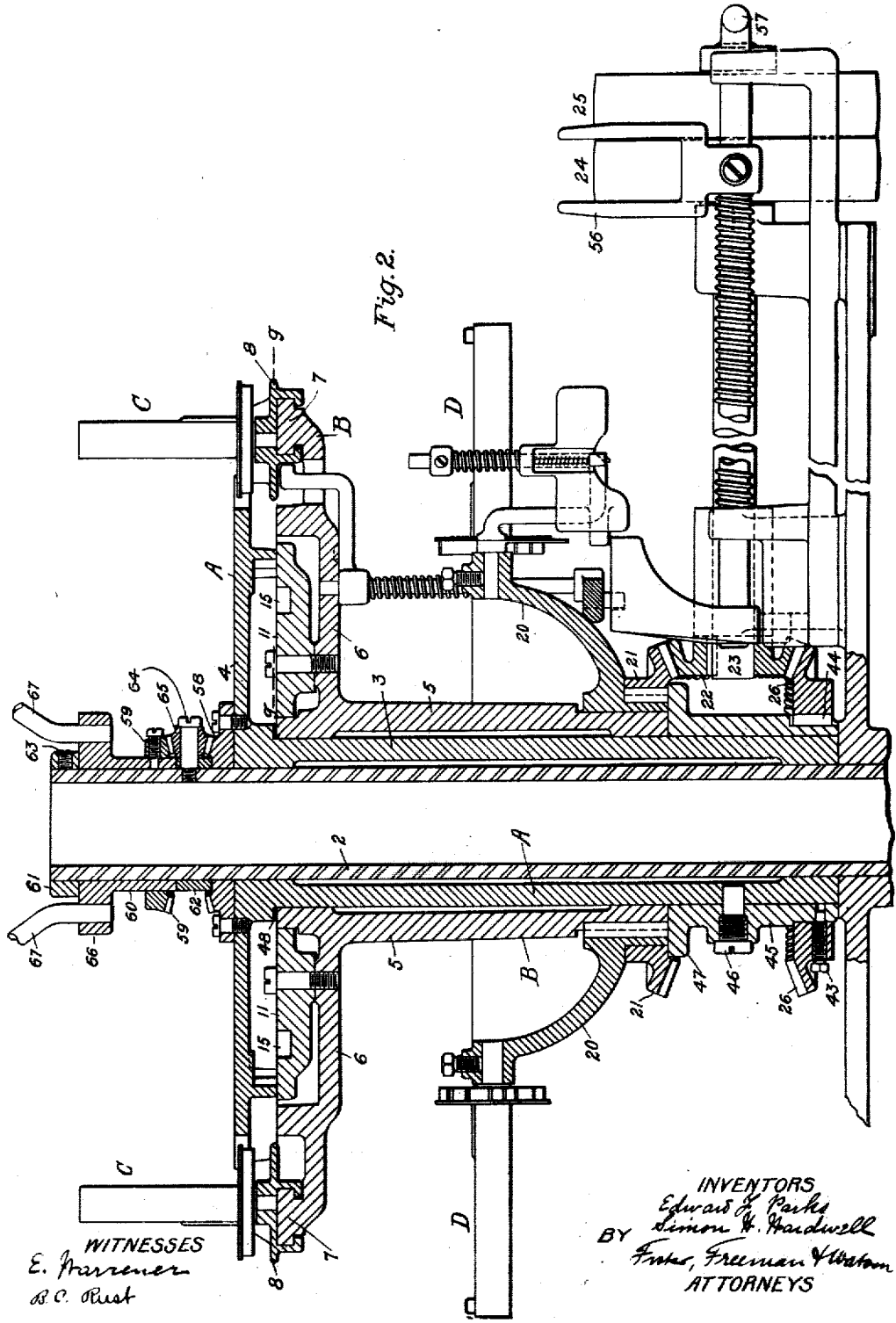

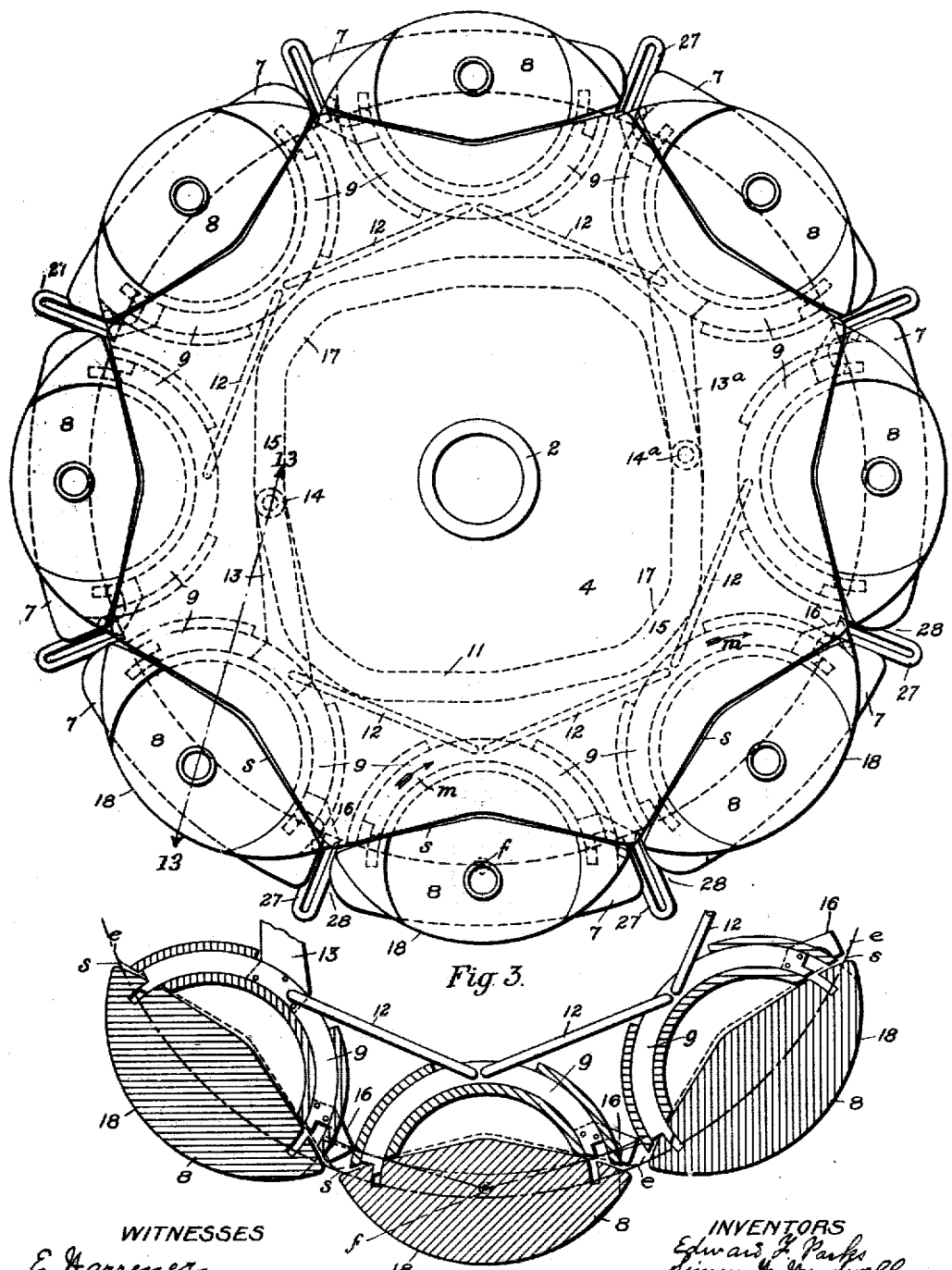

6 SHEETS—SHEET 5.

WITNESSES
E. Harrmer
B. C. Rust

INVENTORS
Edward F. Parks
Simon W. Wardwell
BY
Fisher, Freeman & Watson
ATTORNEYS

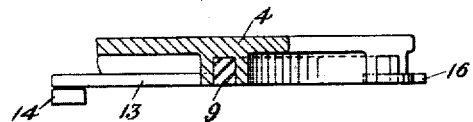
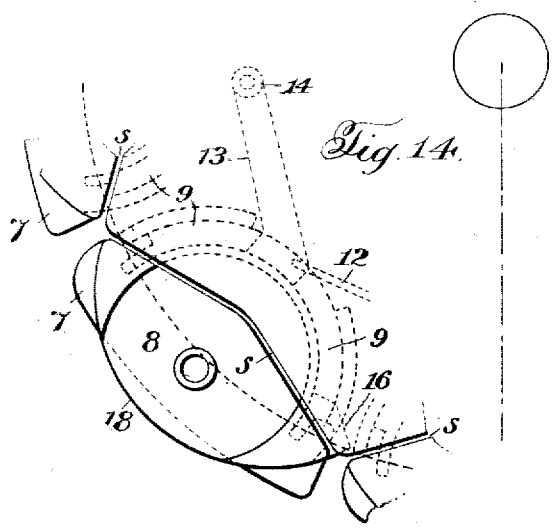

UNITED STATES PATENT OFFICE.

EDWARD F. PARKS AND SIMON W. WARDWELL, OF PROVIDENCE, RHODE ISLAND.

BRAIDING-MACHINE.

No. 851,204.

Specification of Letters Patent.

Patented April 23, 1907.

Application filed August 14, 1905. Serial No. 274,136.

*To all whom it may concern:*

Be it known that we, EDWARD F. PARKS and SIMON W. WARDWELL, citizens of the United States, residing in Providence, in the county of Providence and State of Rhode Island, have invented new and useful Improvements in Braiding-Machines; of which the following is a specification.

Our invention is an improvement in braiding machines, the merit of which lies in its high productive capacity, and the novelty of which consists in that peculiarity and simplicity of form and arrangement which permits the high rate of production.

This new machine belongs to that class of braiding machines in which the braiding operation is performed by an interlacing action of the running yarns themselves, rather than by such an action of the supplies from which the yarns are drawn.

To secure the highest rate of production requires the highest possible speed of the machine, and to attain this the machine must contain the fewest possible and simplest elements, arranged to have the least possible extent and restraint of motion, and least possible susceptibility to wear and backlash. The means for securing these results and the manner of their attainment are fully disclosed in the following specification of which the accompanying drawings form a part.

Figure 1:
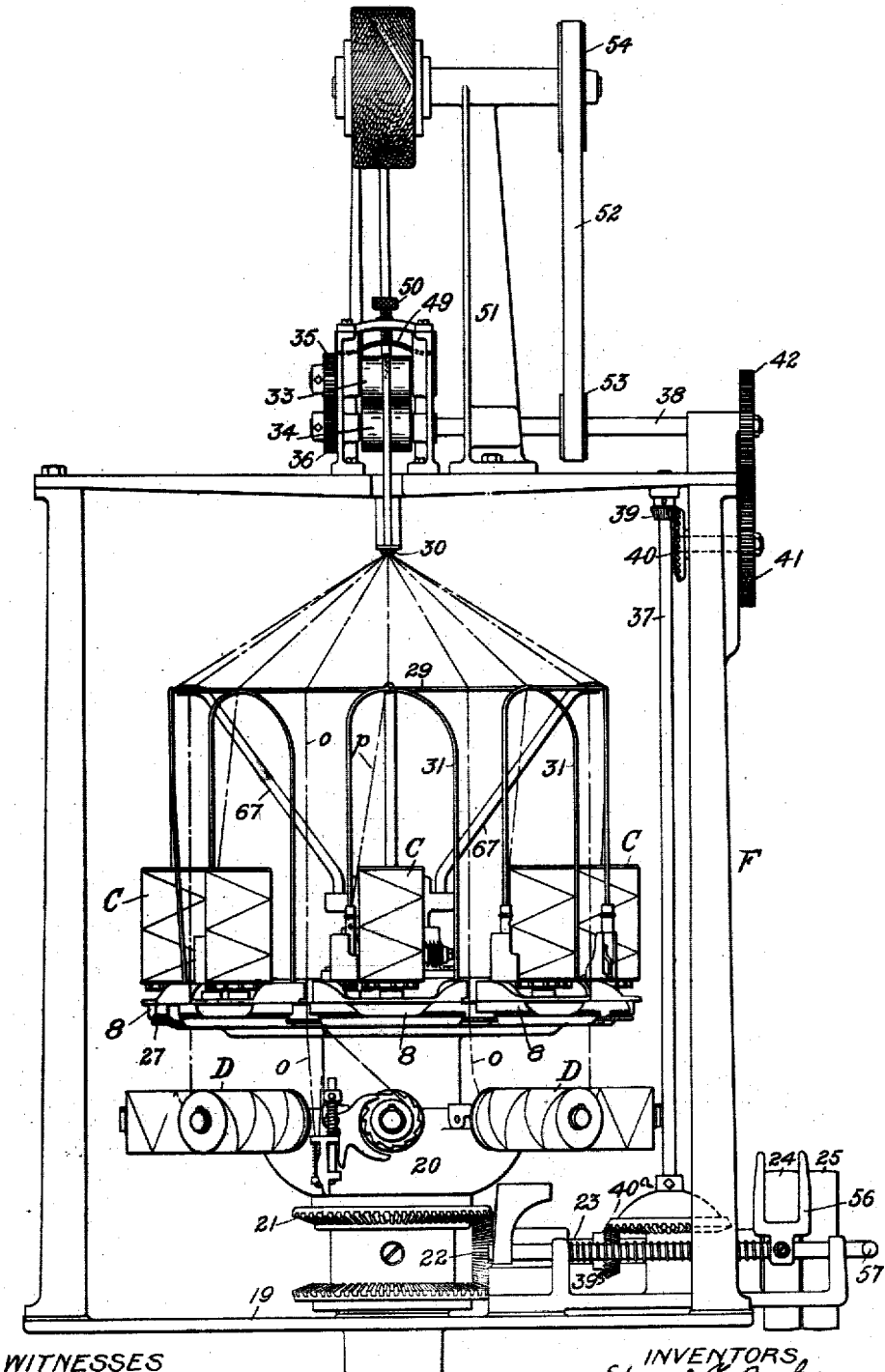
Figure 5:
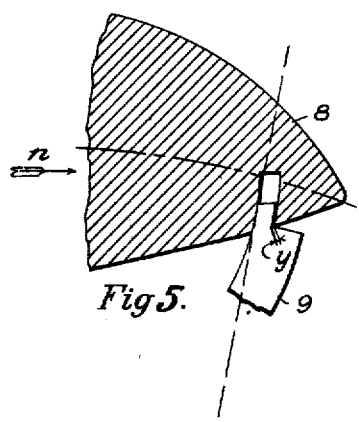
Figure 6:
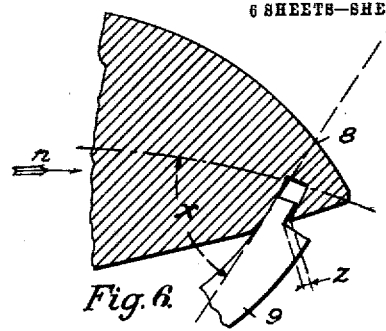
Figure 7:
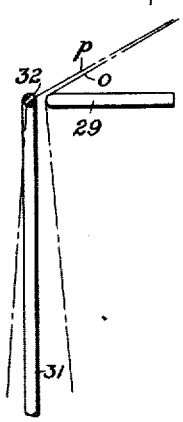
Figure 8:
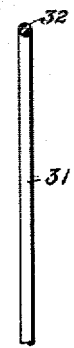
Figure 9:
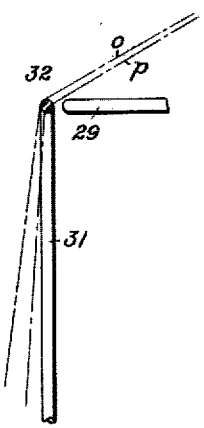
Figure 10:
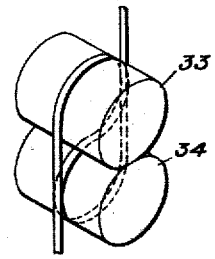
Figure 11:
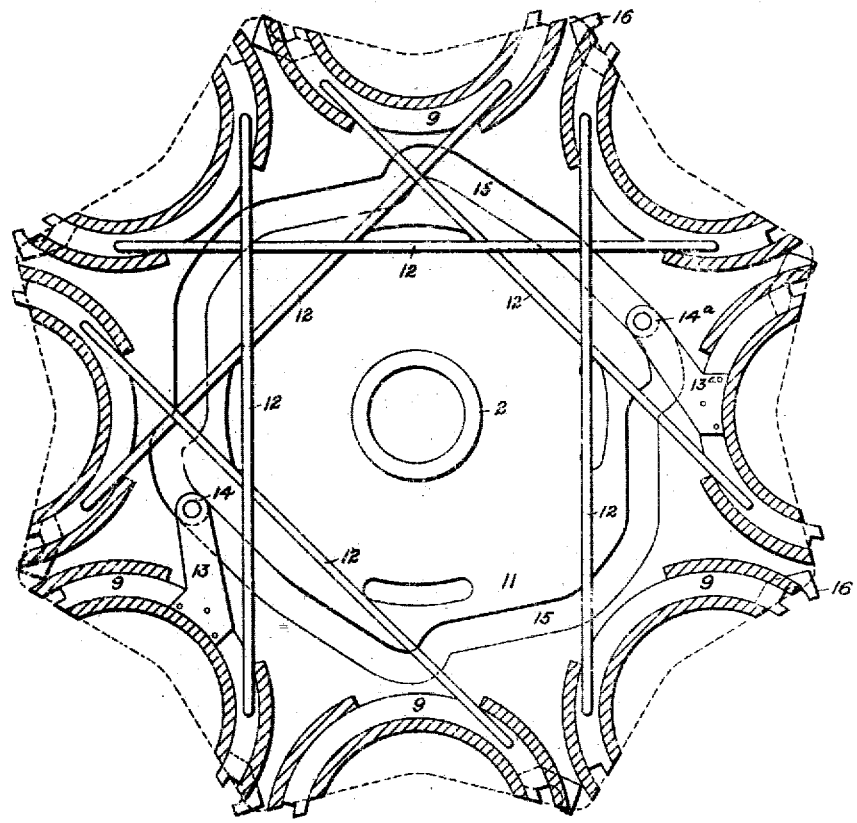
Figure 12:
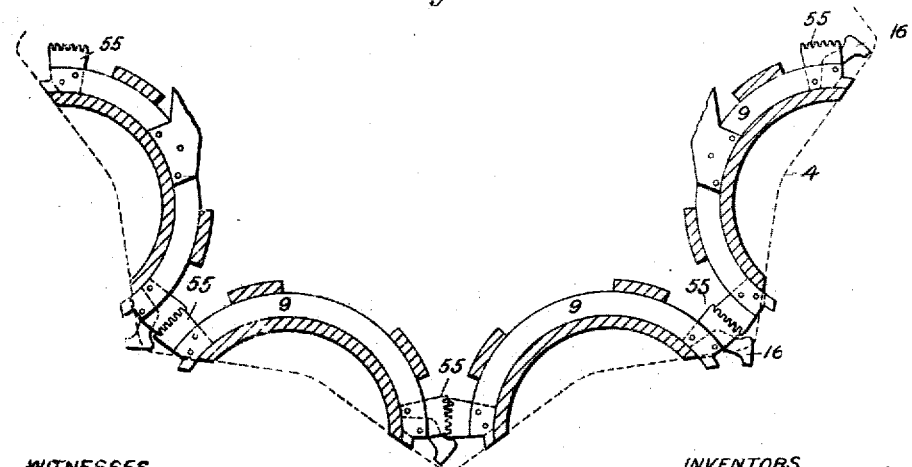

Figure 1 is a front elevation of the machine; Fig. 2 is a section of the main portion of the machine taken through its axis on a plane parallel with the sheet, in Fig. 1; Fig. 3 is a plan view of the braiding mechanism; Fig. 4 is a part section in a horizontal plane through the line g—g, Fig. 2; Figs. 5 and 6 are diagrammatic views illustrating important characteristics of our invention; Figs. 7, 8 and 9 show details of the guide loop; Fig. 10, a diagrammatic detail of the take-up rolls; Figs. 11 and 12, variations. Fig. 13, a section on line 13—13, Fig. 3; Fig. 14, a detailed plan.

The basic feature of our invention is the form and arrangement of the carrier driver, and mode of actuating the same. Therefore, the manner of supporting and driving the carriers will be first described.

The machine has two main rotative elements, see Fig. 2, the carrier frames A and B, on or by which are carried the yarn supplies, and their devices for controlling the delivery and disposition of the yarns to form the braid. These carrier frames A and B rotate coaxially about the post 2 and in opposite directions.

The carrier frame A is mounted directly on the post 2 which constitutes a part of the machine frame. It consists of a sleeve portion 3, in which are bearings for the post 2, and a head or plate 4 in which are mounted the carrier drivers above referred to.

The carrier frame B is mounted on the carrier frame A, having, like it, a sleeve portion 5, with bearings therein, to take the sleeve 3 of the carrier frame A. There is also a head or plate 6 corresponding to the head 4, near the outer circumference of which head is a circular rail 7 for the carriers 8 which carry the upper supplies C. These carriers, though carried on the carrier frame B, are rotated by and with the carrier frame A, through the drivers 9. The drivers are one piece members of areal form, Figs. 3 and 4, which oscillate in a circular groove in the head 5, but whose center of oscillation 7 is within the body of the carrier and at such point that the extremities of the driver move into engagement with the carrier in a direction at right angles to its direction of motion; or, what is the same thing, in a direction that is radial with respect to the carrier's axis of revolution, and normal to its path of revolution. This center of oscillation is, therefore, at the junction of two lines drawn through the points of the driver's engagement with the carriers, and tangent to the path of revolution of said points of engagement. This form and arrangement of driver is of utmost importance, because it insures engagement of the driver with the carrier with the least possible extent of movement, and also, drives the carrier without wedging it against the rail on which it travels.

There is no novelty in the idea of a one-piece driver, but the one-piece driver mounted and arranged as indicated is new, and such form and arrangement are essential to the efficiency of such a machine. In the first place, it is the only form of one-piece driver that can be engaged with the carrier in such manner that the direction of engagement is perpendicular or normal to the path of movement of the carrier. Again, it is essential to our high speed of operation that all backlash, due either to wear or slight play in joints and connections necessary to the requisite fit of the parts, shall be the least possible. Where the drivers engage the carriers in a direction perpendicular to the carrier's direction of travel, such a minimum is secured, for the backlash is only that attributable to any two pieces that engage or couple, by the entering of one into the other. This is indicated in exaggerated manner in Fig. 5, where $y$ indicates such normal play which is also the amount of backlash; the arrow $n$ indicating the direction of motion. In Fig. 6, the driver 9 is shown entering the carrier at a decided angle $x$ with the line of travel $n$, and it is here seen that the extent of backlash $z$ materially exceeds $y$ in Fig. 6.

The drivers are actuated by the cam 11 which is located in the head 5 of the carrier frame B.

As shown in Fig. 3 and Fig. 4, a plurality of the drivers are linked together by the connecting bars 12, and from one driver of the set projects an arm 13 having a roll 14 or other form of traveler to engage the groove 15 of the cam. Thereby, all the drivers of one set or plurality are driven together from the cam 11 by one roll or traveler. In our braider, as shown, there are eight carrier drivers, in two sets of four each, driven from one cam 11 through two rolls 14 and 14$^a$.

At the leading end of each driver is a small plate 16 which we term the switch, as it controls the entrance to the slit $s$. In Fig. 3, the drivers 9 are shown at the extreme of their travel in the direction of the arrow $m$. The switch 16 is then thrown across the entrance of the slit $s$ so as to close it. As the roll 14 is driven outward from the axis of the machine by the high point 17 of the cam, the drivers are moved in a direction the reverse of the arrow $m$ and the switches 16 are withdrawn from the entrance to the slits $s$, see Fig. 4.

As intimated above, one set C of yarn supplies is carried—see Fig. 1 and Fig. 2— by the carriers 8 with the carrier frame A. Another set D is carried below the plane of rotation of the set C, as will be later explained. The yarns $o$ from this lower set D pass upward by the supplies C, and revolve in an opposite direction to the latter, being carried with, and on the carrier frame B. These yarns $o$ from the lower supplies have a path either around the outside edges 18 of the carriers, or through the slits $s$, dependent on the action of the cam 11 as it affects the switches 16.

The head or plate 4 of the carrier frame A is made star-shaped, the number of "points" depending on the number of supplies or carriers employed, which, of course, is determined by the number of yarns entering into the braid and by the number of yarns carried by each individual supply. For instance, the braid might have sixteen strands from sixteen different supplies; or it might be braided with sixteen strands from eight supplies with two yarns on each supply. In the recesses, between the "points," the carriers 8 are pocketed, so that the yarn which travels past the carrier is only deflected approximately half the width of the carrier in passing either to one side or the other. This is best illustrated in Fig. 4, where the dot-dash line $e$ $e$ indicates the mean radial position of the traveling yarn, which, it will be observed, falls just within the points or nose ends of the carriers. This provides that the yarn would normally pass on the inside of each carrier, but to pass the yarn over the outside of the carrier, the switches 16 are arranged to deflect its course radially outward around the nose of the carrier. The carrier 8 is substantially lenticular in form, and its extremities travel in a path coinciding with the mean radial position $e$ $e$ of the yarn.

The action of the traveling yarn can, perhaps, be best described in the following terms: The yarn has a normal path through the slits $s$, and if unobstructed would travel this path. But it has also a series of paths or turnouts—the outer edges 18 of the carriers. Access to these turnouts is controlled by the switches 16 which, when they close the entrances to the slits $s$, deflect the yarn to the said carrier edges 18, causing the yarn to travel outside the carrier, with respect to its axis of revolution. This, then, is an essential and a novelty in our machine, that there are no mechanically operated devices to engage and carry the traveling yarn radially in and out to impart to it an undulatory course in its travel, neither is there any work of shifting deflectors or switches imposed upon the yarn. The undulatory course is imparted by mechanically operated switches which deflect the traveling yarn to one path or another; the cam 11 being provided to mechanically control the switches, and to vary their time and sequence of operation, differently formed cams may be substituted.

Having described the particular devices which produce the braiding action, the machine as a whole will now be described.

Referring particularly to Fig. 1, F is the frame of the machine, from the middle of the bottom member 19 of which rises the tubular post 2, shown only in Fig. 2, about which rotate the carrier frames A and B in the manner before described. At the bottom of the carrier frame B is a cup-shaped portion 20, preferably a separated, but constituent part of the carrier frame. At the bottom of the cup-shaped portion is a bevel-gear 21, keyed or otherwise secured to it, driven from the gear 22 on the main shaft 23 of the machine. At the opposite end of the main shaft 23, from the gear 22, are tight and loose pulleys 24 and 25, by which the machine is operated, and its operation controlled through the belt shipper fork 56 and its handle 57. A bevel-gear 26, at the bottom of the sleeve 3 of the carrier frame A, also meshes with the gear 22, and it obviously must rotate in a direction opposite to that of the gear 21, and therefore the carrier frame A rotates also in a direction opposite to that of the carrier frame B. The bevel-gear 26 is secured by a set screw 43 and key 44 to the flanged sleeve 45 which, in turn, is secured to the sleeve portion 3 of the carrier frame A by the set screw 46. The flange 47 of the sleeve 45 is the foot bearing for the carrier frame B, cooperating with the shoulder 48 on the carrier frame A to limit the carrier frame B in its vertical movement.

The bottom supplies D, with their let-off and other appertaining devices, are mounted in a horizontal plane on the rim of the cup portion 20 of the carrier frame B. Above them run the carriers 8 on the rail 7 which is preferably a portion of the head 6 of the carrier frame B, either integral or separably constituent. The rail 7 is, however, not continuous, but sectional, there being immediately above each of the supplies D a radial slot, 28, Fig. 3, which permits that radial movement of the traveling yarn $o$ necessary to pass the carriers 8, in passage either inside the carrier through the slit $s$, or outside along the edge 18, when the switch 16 closes the slit $s$. Within the slot 28 are guides or abutments 27 which hold the yarns $o$ to the points of the carrier 8, freely permitting a radial movement of said yarns under the wedging action of the carrier, but preventing their deflection in the direction of the carriers' movement.

From the bottom supplies D, the yarns $o$ pass by the carriers 8, upward to the ring 29 and then toward the center to the gatherer or condenser 30, where the braiding yarns converge and are drawn together to form the braided fabric. As the yarn passes from the supply bobbin or cop, it goes through let-off devices which control the delivery of the yarn and insure uniform tension. This let-off device is of a usual form, and therefore it will not be further described than to say that the eye or guide through which it delivers the yarn is nearer the axis of revolution than the entrance to the slit $s$, so that, as the yarns $o$ revolve, their natural tendency is to travel into and through the slits $s$.

The upper supplies C are mounted on the carriers 8 and, like the bottom supplies D, have let-off devices of usual form.

From each carrier there rises vertically a wire loop 31, extending upward with straight sides, but terminating in a curved top which dips or inclines downward toward the leading side. The top of this loop travels adjacent the ring 29. Through the top of the loop 31 is an eye 32 through which the yarn $p$ from the upper supplies C passes, see Fig. 8. The top of the loop projects slightly above the ring 29 so that the yarn $p$ does not engage or bear upon it. Therefore, when the yarn $o$ passes to the inside of the thread $p$ as in Fig. 8, it rides on the ring 29, passing, at that point, under the thread $p$.

When, as in Fig. 9, the yarn $o$ passes to the outside of the thread $p$, being thrown to the outside of the carrier by the switch 16, it rides up the inclined top of the loop 31 and passes over the thread $p$. Thereby are the two sets of threads $o$ and $p$ prevented from interfering or chafing, and when knots occur, those in one set of threads cannot catch the threads of the other set and break or strain them. The function of the loop 31, then, is to augment the function of the switch 16, and of the edge 18 of the carrier. These last named elements divert and pass the traveling thread $o$ outward around a carrier and the supply which it carries. The loop 31 engages the diverted thread, and carries it outside of and maintains it clear from the thread $p$ that comes from the carrier's supply.

The ring 29 is mounted and actuated in the following manner: Secured to the top of the head 4 is a bevel-gear 58, centralized by the post 2 which extends through and above it. Opposed to this is another bevel-gear 59, secured to a flanged sleeve 60 that is rotatable on the post 2, and held from end movement by the collars 61 and 62. The upper collar 61 is held by the set screw 63; the lower collar 62 is held by a stud screw 64 which passes through the collar and screws into the post 2. On this stud screw is mounted an intermediate gear 65 which meshes with and rotatively connects the gears 58 and 59. From the flange 66 of the sleeve 60 rise and diverge the arms 67 on top of which is fastened the ring 29. Because of the arrangement of the gears 58, 59 and 65, the ring 29 must obviously rotate in a direction opposite to that of the carrier frame A, of which the head 4 is a part, and, therefore, in the same direction and with the same speed as the carrier frame B and the yarn supplies carried with it. Rotating thus, at the same speed and with the same direction as the lower supplies D, the ring 29 serves, therefore, as a carrier, helping the yarns $o$ in their revolution. Without this feature, the yarns $o$ would drag and be frictionally retarded as well as abraded. As the yarns $p$ are guided above the ring 29, the latter, in its rotation, does not rub them or in any way interfere with them.

After the yarns pass the ring 29, they go through the condenser 30 and from there to the take-up rolls 33 and 34. These are connected by the gears 35 and 36, and are driven from the main shaft 23, through the shafts 37 and 38 and the gears 39, 40, 39ª, 40ª, 41 and 42. The take-up rolls are pressed together by tension of the spring 49, and are also drawn together by action of the braid. As indicated in Fig. 10, the braid is carried first over the top roll 33, then down and through, between the two rolls, under the bottom roll 34, and up, so that any tension on the braid acts, as above indicated, to draw the rolls together. The screw 50 serves to vary the spring pressure of the rolls.

Above the take-up device is a winding mechanism of suitable character, mounted on the stand 51 and driven by belt 52, from the pulley 53 on the shaft 38 through the pulley 54.

We have shown our improved devices so arranged that the switches 16 are all opened and all closed at the same time, so that one of the bottom supply threads $o$ goes to the outside of one carrier and to the inside of the next one, for the cam has four low spots which cause closure of the switches 16 when said thread $o$ is passing four of the eight carriers, and their opening when passing the other four. This causes the production of one form of braid. Another form of braid requires that each of the yarns $o$ shall pass outside of two carriers and then inside of two. To accomplish this, only alternate switches are open at one time, and the others are closed. Each driver has, then, a direction of movement opposite to that of its neighbor. This may be accomplished as in Fig. 11, by linking alternate drivers together, but it necessitates a crossing of the links which is undesirable when a simpler and more direct means may be employed. Fig. 12 shows the preferred mode of accomplishing the same result, by providing each driver with a small segmental gear 55 which, meshing with that of its neighbor, secures the same alternate oscillation of the drivers as would the crossed link connection.

Automatic stopping devices of a usual form are employed for arresting the operation of the machine upon the breaking of any one of the threads delivered by either set of supplies, either C or D, but as these form no part of the present invention, they will not be described.

Obviously, these essential features can be combined in other ways than those indicated, without departing from the spirit and scope of our invention. It might be desirable to revolve the yarn supplies of only one set, and therefore, in the foregoing, terms employed to indicate movement or direction are to be construed in their broadest sense—that of relation and not of absolute movement.

Therefore, without limiting ourselves to the precise form and arrangement of construction described, we claim:

1. In a braiding machine, the combination with a carrier, and means for moving same, comprising an oscillating driver having its center of oscillation within said carrier.

2. In a braiding machine, the combination with a revolving carrier and means for moving same, comprising a one-piece driver having its center of oscillation on the line drawn tangent to the path of revolution of the point of engagement of driver with carrier, and passing through said point of engagement.

3. In a braiding machine, the combination with revolving carriers, of drivers therefor, means to actuate one of the drivers, and means to couple a plurality of the drivers so that the actuation of the one affects all.

4. In a braiding machine, the combination with a rotating plate and supplies, of carriers to carry said supplies, pocketed within the outer edge of the plate and drivers to connect the plate and carriers.

5. In a braiding machine, the combination with a rotating plate and carriers mounted adjacent thereto, and arranged with slits between the plate and carriers, of switches to close said slits and means to operate the switches.

6. In a braiding machine, the combination with a rotating plate and carriers mounted adjacent to the plate and arranged with slits between plate and carriers, of switches to close said slits and means to operate a switch and means to couple a plurality of switches so that action of the one switch causes action of all.

7. In a braiding machine, the combination with a rotating plate and carriers mounted adjacent said plate and arranged with slits between the carriers and the plate, of drivers to connect the carriers with the plate, switches to open and close entrance to said slits, and means to operate both switches and drivers.

8. In a braiding machine, the combination with a plate and carriers mounted adjacent thereto and arranged to leave slits between the carriages and the plate, the radially outer edge of each carrier constituting one path of travel for a traveling yarn, and the slit between the plate and carrier constituting another path, of switches to determine which path the traveling thread shall traverse, and means to operate the switches.

9. In a braiding machine, the combination with a rotating plate and carriers mounted adjacent thereto, of means for traveling a thread either between the carriers and the plate or outside of the carriers, drivers mounted in the plate, each adapted to engage, first by one of its ends and then the other, a carrier, switches to control access to the slits between the plate and carriers, and means to engage the drivers with the carriers, first by one end and then by the other, and in this shifting of the drivers to shift the said switches.

10. In a braiding machine, the combination with a rotating plate having a plurality of circular grooves whose centers are outside the edge of the plate, circular drivers in said grooves, and carriers moving with the plate, engaged by said drivers, a cam to operate the drivers, and means to couple a plurality of drivers so that the action of the cam on one affects all of the plurality.

11. In a braiding machine, the combination with two members rotating in opposite directions and two sets of revolving yarn supplies, one set revolving with each member, of means to pass the threads from one set of supplies by the other set of supplies, and auxiliary means to pass the same threads over or by the threads from the other set, after they have left their supplies, without interference.

12. In a braiding machine, the combination with two members rotating in opposite directions, one formed or furnished with a rail, made sectional by radial slots in said member, one set of thread supplies mounted to travel on said rail, another set of yarn supplies fixedly mounted on said member to rotate with it, the other member formed with circular ways, oscillating drivers in said ways, and means to oscillate the drivers, carriers engaged by said drivers, carrying the first named set of supplies and mounted on the aforesaid rail, and switches mounted on the drivers to move with them and control entrance to the slits between the carriers and the member that revolves them.

13. In a braiding machine, the combination with a recessed plate, a rail adjacent the plate, carriers slidably mounted on the rail and means to connect the carriers with said plate.

14. In a braiding machine, the combination with a recessed plate, a rail adjacent the plate, carriers slidably mounted on the rail and extending within the recesses of the plate and means to connect the carriers with the plate.

15. In a braiding machine, the combination with a plate having a recessed edge and carriers within said recesses, of means to constantly connect the carriers with the plate, and means cooperating with said connecting means to permit or prevent passage of the yarn between carriers and plate.

16. In a braiding machine, the combination with a carrier frame A having a sleeve portion 3, a head 4 and a shoulder 48, and a sleeve 45 mounted on the sleeve portion 3 and having a flange 47, of a second carrier frame B, mounted rotatively on the sleeve 3 between the shoulder 48 and the flange 47, having a rail 7 and carriers slidable thereon, and arranged with slits s between the carriers and head portion 4, driving means to connect the carrier driving means with the plate 4, switches to control access to the slits s and means to operate the switches with the carrier driving means.

17. The combination with a set of revolving yarn supplies and a ring above rotating therewith, to receive the yarn from said supplies, of a second set of yarn supplies revolving in a direction opposite to that of the first and loops to receive the yarns from the second set of supplies, and means to pass the yarns from the two sets of supplies by each other with an interlacing action.

18. The combination with a set of revolving yarn supplies and a ring above rotating therewith to receive the yarns from said supplies, of a second set of yarn supplies revolving in a direction opposite to that of the first set, loops revolving with the second set, having eyes to receive the yarns from the second set, and means to pass the yarns from the two sets of supplies by each other with an interlacing action.

19. The combination with a set of revolving yarn supplies and loops revolving therewith having eyes to receive the yarn from the supplies, of a ring rotating coaxially with, but in a direction opposite to that of the said supplies, and a second set of supplies rotating with the ring, means to drive the yarn supplies, and means to pass the yarns from the second set of supplies to either side of the supplies of the first set for the purpose specified.

20. In a braiding machine, the combination with two sets of yarn supplies, carriers to carry one set of supplies and means to drive the carriers, of means to guide the yarns of the second set of supplies to either side of the supplies of the first set, abutments to control the yarns, and means to pass the yarns of one set of supplies by the yarns of the other set of supplies without interference.

21. In a braiding machine, the combination with a frame and its vertical post 2, of a rotating carrier frame A, having a head portion 4 and a sleeve portion 3 mounted on the post, a flanged sleeve 45 mounted on the sleeve portion 3, a second carrier frame B vertically supported on the flange of the sleeve 45 and rotatable on the sleeve portion 3, and having a rail 7, carriers mounted on the rail, means to drive the carriers, means to control the driving means, and means to oppositely rotate the carrier frames.

22. In a braiding machine, the combination with a set of yarn supplies and a second set of yarn supplies whose yarns move with an interlacing action among the supplies of the first set, of a rotating ring to receive the yarns from the second set of supplies and carry them in their revolution.

23. The combination with a set of revolving yarn supplies and a ring above rotating with them to receive the yarn from said supplies, of a second set of yarn supplies revolving in a direction opposite to that of the first, and means to travel the yarns from the first set of supplies in and out among the supplies of the second set.

In testimony whereof we have signed our names to this specification in the presence of two subscribing witnesses.

EDWARD F. PARKS.
SIMON W. WARDWELL.

Witnesses:
CHAS. A. EDDY,
HENRY J. GOBEILLE.